US008868218B2

(12) United States Patent
Park et al.

(10) Patent No.: US 8,868,218 B2
(45) Date of Patent: Oct. 21, 2014

(54) CUSTOMIZED CONTROL SYSTEM FOR ELECTRICAL APPLIANCES USING REMOTE DEVICE

(76) Inventors: Soohong Park, Seoul (KR); Eunyoung Choi, Seoul (KR)

( * ) Notice: Subject to any disclaimer, the term of this patent is extended or adjusted under 35 U.S.C. 154(b) by 337 days.

(21) Appl. No.: 13/293,929

(22) Filed: Nov. 10, 2011

(65) Prior Publication Data
US 2012/0123561 A1 May 17, 2012

(30) Foreign Application Priority Data

Nov. 11, 2010 (KR) .......................... 10-2010-0112030

(51) Int. Cl.
| G05B 11/01 | (2006.01) |
| G05B 19/02 | (2006.01) |
| G08C 19/16 | (2006.01) |
| G08B 1/08 | (2006.01) |
| H04M 3/00 | (2006.01) |
| H04L 29/08 | (2006.01) |
| H04L 12/28 | (2006.01) |
| G05B 15/02 | (2006.01) |

(52) U.S. Cl.
CPC ........ *G05B 15/02* (2013.01); G05B 2219/2642 (2013.01); *H04L 67/00* (2013.01); *H04L 12/2818* (2013.01); *H04L 67/025* (2013.01); G05B 2219/21102 (2013.01)
USPC .... 700/17; 340/4.32; 340/12.25; 340/539.14; 455/420

(58) Field of Classification Search
CPC ............... G08C 2201/93; H04L 2012/285; H04L 12/2818; H04L 12/2825; D06F 33/02; D06F 39/005; H04M 1/72533; A47L 15/0063; G05B 15/02

USPC ................ 700/11, 17, 19, 20; 455/3.01, 3.03, 455/3.04, 3.06, 403, 418–420; 340/3.1, 3.3, 340/4.3, 12.1, 12.15, 12.22–12.26, 12.29, 340/500, 531, 539.1, 539.14, 4.32
See application file for complete search history.

(56) References Cited

U.S. PATENT DOCUMENTS

| 6,731,201 | B1 * | 5/2004 | Sharood et al. ............ 340/12.32 |
| 7,206,559 | B2 * | 4/2007 | Meade, II ................... 455/151.1 |
| 7,548,491 | B2 * | 6/2009 | Macfarlane ................... 367/198 |
| 8,095,065 | B2 * | 1/2012 | Nagara et al. ................ 455/3.06 |
| 8,126,450 | B2 * | 2/2012 | Howarter et al. ............. 455/420 |
| 8,269,622 | B2 * | 9/2012 | Chan et al. .................... 340/538 |

(Continued)

FOREIGN PATENT DOCUMENTS

| JP | 2002-247662 A | 8/2002 |
| KR | 2003-0054238 A | 7/2003 |

(Continued)

*Primary Examiner* — Crystal J Barnes-Bullock
(74) *Attorney, Agent, or Firm* — Rabin & Berdo, P.C.

(57) ABSTRACT

A remote device having an electrical appliance control function and an electrical appliance control system are provided. The remote device includes an appliance communication module for communicating with an electrical appliance which is used by a user inside or outside home using power; a network communication module for supporting communication with outside to obtain user set optimal control data which controls the electrical appliance to operate in some other mode than an operation mode basically provided by a manufacturer of the electrical appliance; and a control part for controlling the electrical appliance based on the user set optimal control data. Hence, user's convenience can be promoted by allowing the user to control the electrical appliance on the optimal condition.

13 Claims, 6 Drawing Sheets

(56) References Cited

U.S. PATENT DOCUMENTS

| | | | |
|---|---|---|---|
| 8,326,259 B2 * | 12/2012 | Gautama et al. | 455/404.1 |
| 8,509,922 B2 * | 8/2013 | Yum et al. | 700/17 |
| 2001/0049846 A1 * | 12/2001 | Guzzi et al. | 8/158 |
| 2010/0075655 A1 * | 3/2010 | Howarter et al. | 455/420 |
| 2010/0283573 A1 * | 11/2010 | Yum et al. | 340/3.1 |
| 2011/0005580 A1 * | 1/2011 | Vandermeulen | 136/251 |
| 2011/0296506 A1 * | 12/2011 | Caspi | 726/6 |
| 2012/0007730 A1 * | 1/2012 | Vecht-Lifshitz et al. | 340/442 |
| 2012/0110747 A1 * | 5/2012 | Yum et al. | 8/137 |
| 2012/0215664 A1 * | 8/2012 | Dalal et al. | 705/27.1 |

FOREIGN PATENT DOCUMENTS

| | | |
|---|---|---|
| KR | 2005-0002182 A | 1/2005 |
| KR | 2009-0057600 A | 6/2009 |
| KR | 2010-0122027 A | 11/2010 |

* cited by examiner

CUSTOMIZED CONTROL SYSTEM FOR ELECTRICAL APPLIANCES USING REMOTE DEVICE

The present application claims the benefit under 35 U.S.C. §119(a) to a Korean patent application filed in the Korean Intellectual Property Office on Nov. 11, 2010, and assigned Serial No. 10-2010-0112030, the entire disclosure of which is hereby incorporated by reference.

TECHNICAL FIELD OF THE INVENTION

The present invention relates to a remote device having an electrical appliance control function for promoting user's convenience by allowing the user to control electrical appliances under an optimal condition, and a system for controlling the electrical appliances.

BACKGROUND OF THE INVENTION

As technologies advance and convenience of living is pursued, home automation for inspecting operation state and controlling operation of electronic products in the home using a personal terminal such as personal computer or mobile phone is developed and supplied. Using the home automation, a user can control the operation of the electronic product at a remote distance or at a close distance without having to directly contact the electronic product. However, the present-day home automation allows the user to select one of a plurality of modes pre-designed by a manufacturer. While products allowing the user to change the mode within a predefined range are developed, the range of the user change is not that wide in fact.

For example, a washing machine allows to select a washing mode by dividing a type of laundry into four or five types. However, the type of the laundry is far more diverse and it is not easy to define the washing modes suitable for characteristics of all of the clothes. Hence, while the user can change and use the washing mode based on the laundry in some degree, it is difficult for the user to be sure that the changed mode is an optimal mode for the corresponding laundry.

Accordingly, when the users are allowed to access a product control domain and the users can share information related to the detailed user washing mode which is set and verified by the users, the user's convenience can be maximized and concurrently the limited product use can advance to a higher level. This can be applied to not only the washing machine but also electrical appliances including other electronic products and automobiles.

SUMMARY OF THE INVENTION

To address the above-discussed deficiencies of the prior art, it is a primary aspect of the present invention to provide a remote device having an electrical appliance control function for achieving an optimal status desired by a user when the electrical appliance is operated, by mutually sharing various electrical appliance operation methods set and verified by users, and a system for controlling the electrical appliances using the remote device.

According to one aspect of the present invention, a remote device includes an appliance communication module for communicating with an electrical appliance which is used by a user inside or outside home using power; a network communication module for supporting communication with outside to obtain user set optimal control data which controls the electrical appliance to operate in some other mode than an operation mode basically provided by a manufacturer of the electrical appliance; and a control part for controlling the electrical appliance based on the user set optimal control data.

According to another aspect of the present invention, an electrical appliance control system includes an electrical appliance used by a user inside or outside home using power; a social network for providing user set optimal control data which controls the electrical appliance to operate in some other mode than an operation mode basically provided by a manufacturer of the electrical appliance; and the remote device for controlling the electrical appliance using the optimal control data obtained via the social network.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

Figure 1:
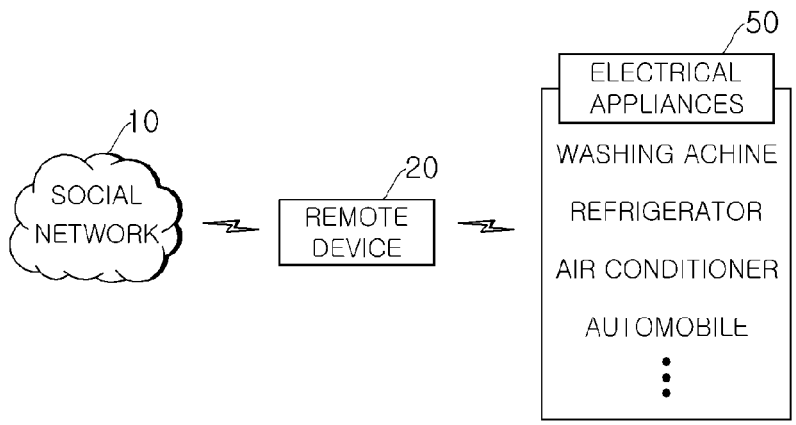
FIG. 1 is a simplified diagram of an electrical appliance control system using a remote device according to one exemplary embodiment of the present invention.
Figure 2:
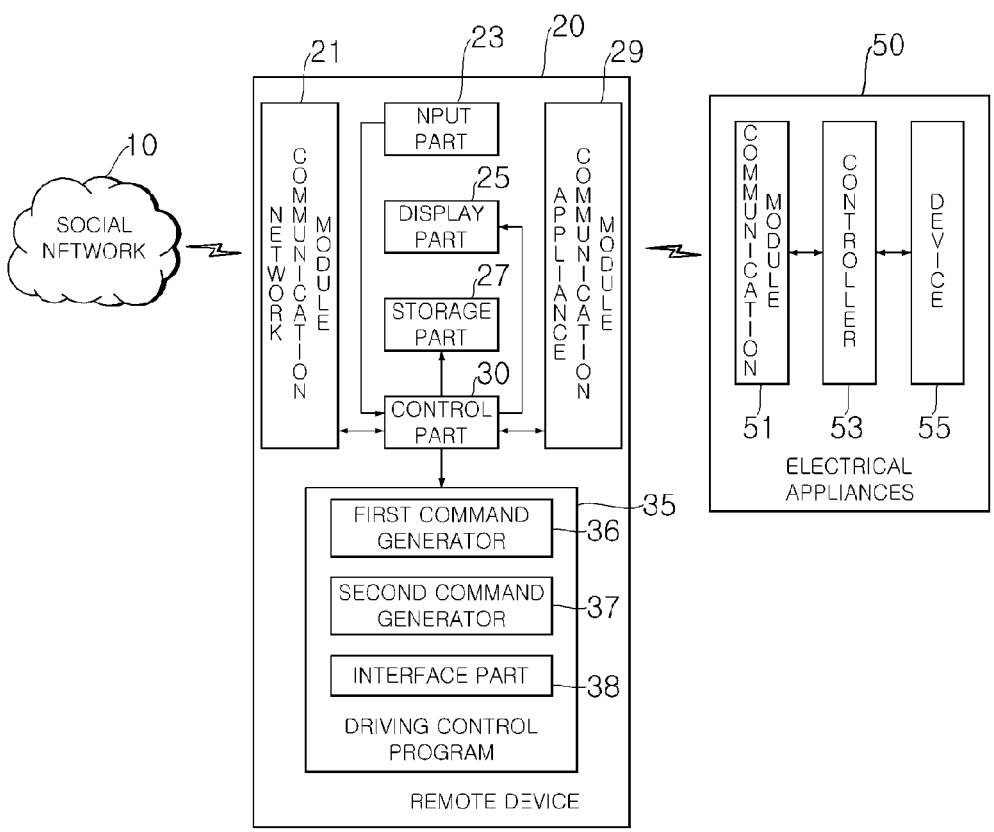
FIG. 2 is a detailed block diagram of the electrical appliance control system of FIG. 1.

FIG. 1 is a simplified diagram of an electrical appliance control system using a remote device according to one exemplary embodiment of the present invention, and FIG. 2 is a detailed block diagram of the electrical appliance control system of FIG. 1.

The electrical appliance control system includes various electrical appliances 50 usable by a user inside or outside the home, a social network 10 for receiving optimal control data for optimally controlling the electrical appliances 50, and a remote device 20 for controlling the electrical appliances 50 using user set optimal control data obtained via the social network 10.

Herein, the optimal control data is data generated and distributed by individual user of the electrical appliance 50 through direct experience. The optimal control data can be a user set mode considered to achieve an optimal result of the electrical appliance 50 in a certain condition desired by the user when the various electrical appliances 50 are operated. That is, the optimal control data is data for controlling to operate the electrical appliance in some other mode than an operation mode basically provided by a manufacturer of the electrical appliance in the product release of the electrical appliance 50, and can be empirically derived by the users by directly using the corresponding electrical appliance.

For example, the optimal control data can include a method for operating an air conditioner to reach an intended room temperature as quickly as possible, a method for setting a washing time of a washing machine in order to wash a favorite blouse in the cleanest way without damage, and a method for setting a temperature to keep a fish in a refrigerator freshly for a long time. It is noted that the optimal control data may be generated and distributed by the manufacturer or a developer after the release of the corresponding product.

The electrical appliances 50 can include various home appliances, computers, and automobiles used by the user. The home appliances can include various products used at home, such as washing machine, air conditioner, refrigerator, TV, audio system, VCD, and DVD.

The electrical appliance 50 basically includes a controller 53 for controlling the electrical appliance 50, and various devices 55 controlled by the controller 53. In addition, the electrical appliance 50 can further include a communication module 51 for communicating with the remote device 20. The electrical appliance 50 can communicate with the remote device 20 using various communication schemes such as telecommunication company network and Wi-Fi. When using a short-range communication scheme of the communication module 51, the electrical appliance 50 can adopt the communication scheme such as Radio Frequency IDentification (RFID) and Bluetooth.

For example, in a typical washing machine, the controller 53 controls a tub for receiving and washing laundry in a main body, a motor for rotating the tub, a water supply device, a drain device, and a detergent supply device. Herein, the controller 53 can control the devices 55 using the optimal control data provided from the remote device 20.

The social network 10 is the source for providing the optimal control data to the user so as to control the electrical appliance 50. The social network 10 may refer to a human network for contacting the other person offline, or can include an on-line network including Social Network Service (SNS) such as online café, blog, Twitter, and Facebook over the Internet.

The user can access the social network 10 and obtain the optimal control data for controlling the electrical appliance 50. For example, when the social network 10 is the human network, the user can obtain the optimal control data from the other person of the human network using a means such as voice or text.

In more detail, when the washing machine is used, the washing machine performs one washing job through various kinds of a washing process, a rinsing process, and a spinning process. The washing process includes pre-washing, soak washing, and main washing. In the rinsing process, the number of the rinses, a spinning speed, and a spinning cycle, a detergent detection level, and a water supply can be selected. In the spinning process, a spinning time and a spinning speed can be regulated.

When knitwear is washed using the washing machine, the user can receive from his/her friend the optimal control data which is information about the setting of the washing machine to wash the knitwear most cleanlily, rapidly, and economically without fabric damage. The user can receive the optimal control data from the friend by words in person or using the means such as telephone, Internet café, blog, and SNS. At this time, the friend may upload the optimal control data as a simple text or a file to the Internet café, the blog, or the SNS. When the file is uploaded, the file can be uploaded as a general Word or Office file, or as a control file which can be downloaded and processed in the remote device 20 of the user and directly used to control the electrical appliance 50.

The remote device 20 can include various devices used by the individual user, and can include, for example, a mobile phone, a smart phone, a Portable Multimedia Player (PMP), and a tablet PC. The remote device 20 includes devices for the functions of the remote device 20, an appliance communication module 29 for communicating with the electrical appliance 50 of the user, and a network communication module 21 for communicating with the social network 10. In addition, the remote device 20 includes a storage part 27 for storing the optimal control data obtained from the social network 10 and various programs, an input part 23 for inputting data or a command from the user, a display part 25 for displaying input contents of the user and the operation of the remote device 20, a driving control program 35 for controlling the electrical appliance 50, and a control part 30 for controlling the driving of the driving control program 35 according to the user's input.

The appliance communication module 29 communicates with the electrical appliance 50 such as washing machine, air conditioner, refrigerator, and automobile, and sends a control command generated by the driving control program 35 to the corresponding electrical appliance 50. The appliance communication module 29 can support various communication schemes (the telecommunication company network, Wi-Fi, etc.), and supports the communication with the electrical appliance 50 in a short range using RFID or Bluetooth.

The network communication module 21 supports the remote device 20 to access the network such as Internet, over a wired or wireless communication network. Hence, the remote device 20 can access the social network 10 such as Internet café, blog, and SNS, and receive the optimal control data for controlling the electrical appliance 50.

According to the support of the network communication module 21, the storage part 27 temporarily or permanently stores the optimal control data acquired via the social network 10 so that the user can use the optimal control data to control the electrical appliance 50. The storage part 27 stores the driving control program 35 for controlling the electrical appliance 50, and various application programs for the operation of the remote device 20.

The driving control program 35 can include a first command generator 36 for generating a control command to control the electrical appliance 50 using the optimal control data directly input by the user, a second command generator 37 for generating a control command by processing the optimal control data stored as the control file, and an interface part 38 for providing a user interface allowing the user to input the optimal control data.

When the user inputs the optimal control data using the input part 23, the control part 30 drives the interface part 38 of the driving control program 35 to provide the user interface to the user. When the user accesses the Internet by driving the network communication module 21 and downloads the control file, the control part 30 executes the driving control program 35 to generate the control command. When the driving control program 35 generates the control command, the control part 30 sends the control command to the appliance communication module 29 to forward the control command to the corresponding electrical appliance 50.

Figure 3:
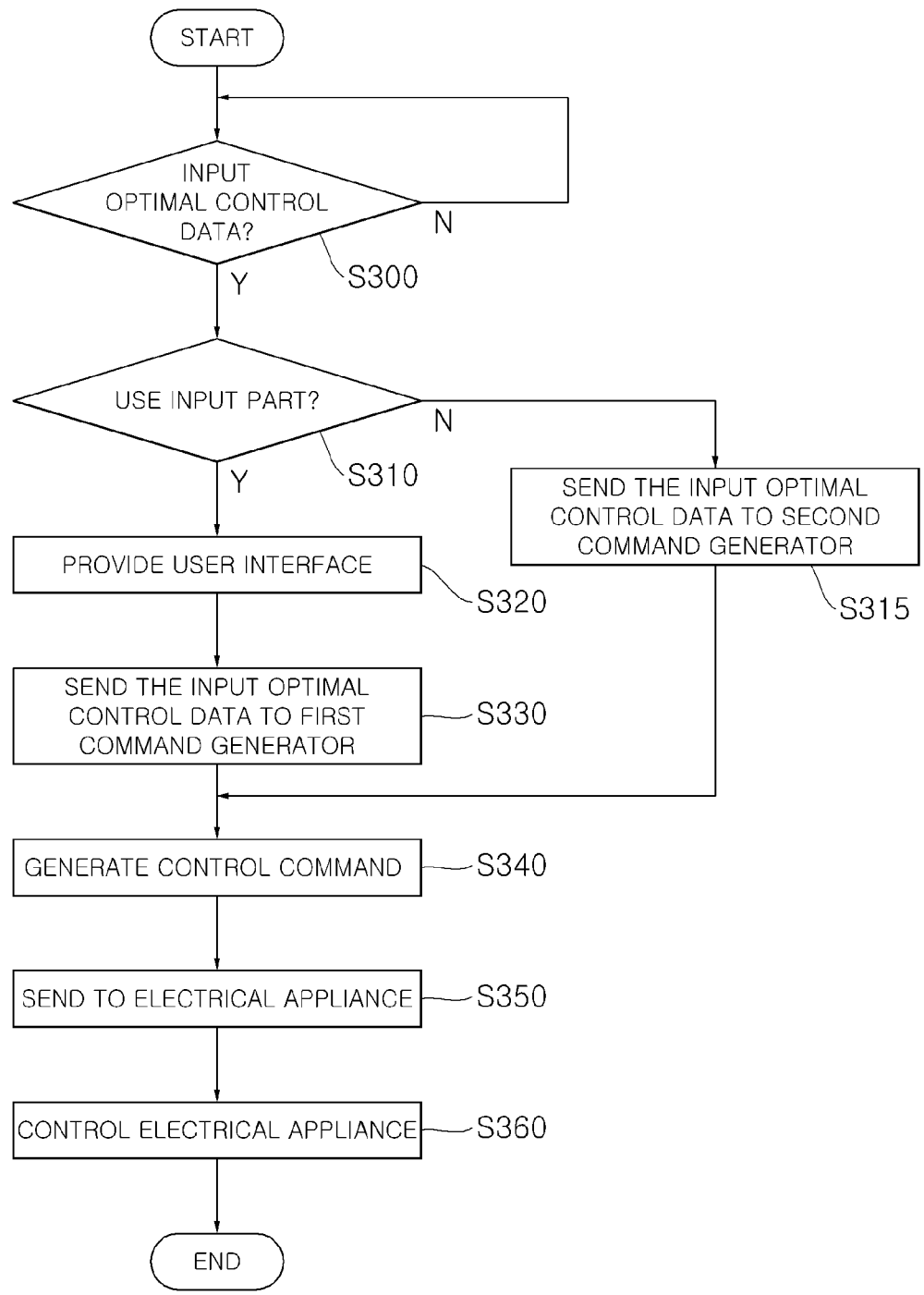
FIG. 3 is a flowchart of a method for controlling an electrical appliance in the electrical appliance control system using the remote device according to one exemplary embodiment of the present invention.

FIG. 3 is a flowchart of a method for controlling the electrical appliance in the electrical appliance control system using the remote device according to one exemplary embodiment of the present invention.

When the user wants the optimal control data for controlling the electrical appliance 50, the user can get the optimal control data in three manners as follows. First, the user may directly receive the experiential optimal control data from the acquaintance in words. In this case, the user needs to input the optimal control data to the remote device 20 in person.

The user can access the social network 10 using the Internet through the remote device 20, a computer, or a notebook and obtain the optimal control data written as the text or the general file and uploaded by the acquaintance or the other person. Upon obtaining the optimal control data written as the text or the general file, the user needs to personally input the optimal control data in the remote device 20 in accordance with the control file format applicable to the electrical appliance 50.

Lastly, the user can obtain the optimal control data written as the control file using the remote device 20. When the control file is downloaded to the remote device 20, the control file can be converted immediately to the control command in the driving control program 35 installed to the remote device 20 without a separate user input.

When the optimal control data is input (S300), the control part 30 of the remote device 20 determines whether the user personally inputs the optimal control data to the remote device 20 using the input part 230 (S310). When the user directly inputs, the control part 30 drives the interface part 38 of the driving control program 35 to provide the user interface to the user (S320). Next, when the user completes the input of the optimal control data, the control part 30 drives the first command generator 36 of the driving control program 35 to convert the optimal control data to the control command (S330 and S340). The control part 30 drives the appliance communication module 29 to send the control command to the corresponding appliance hardware 50 (S350).

By contrast, when the control file is downloaded through the network communication module 21, the control part 30 of the remote device 20 drives the second command generator 37 of the driving control program 35 to generate the control command (S315 and S340). When the driving control program 35 generates the control command, the control part 30 sends the control command to the appliance communication module 29 to forward the control command to the corresponding electrical appliance 50 (S350).

According to the control command received from the remote device 20, the controller 53 of the electrical appliance 50 operates the devices based on the optimal control data (S360).

Figure 4:
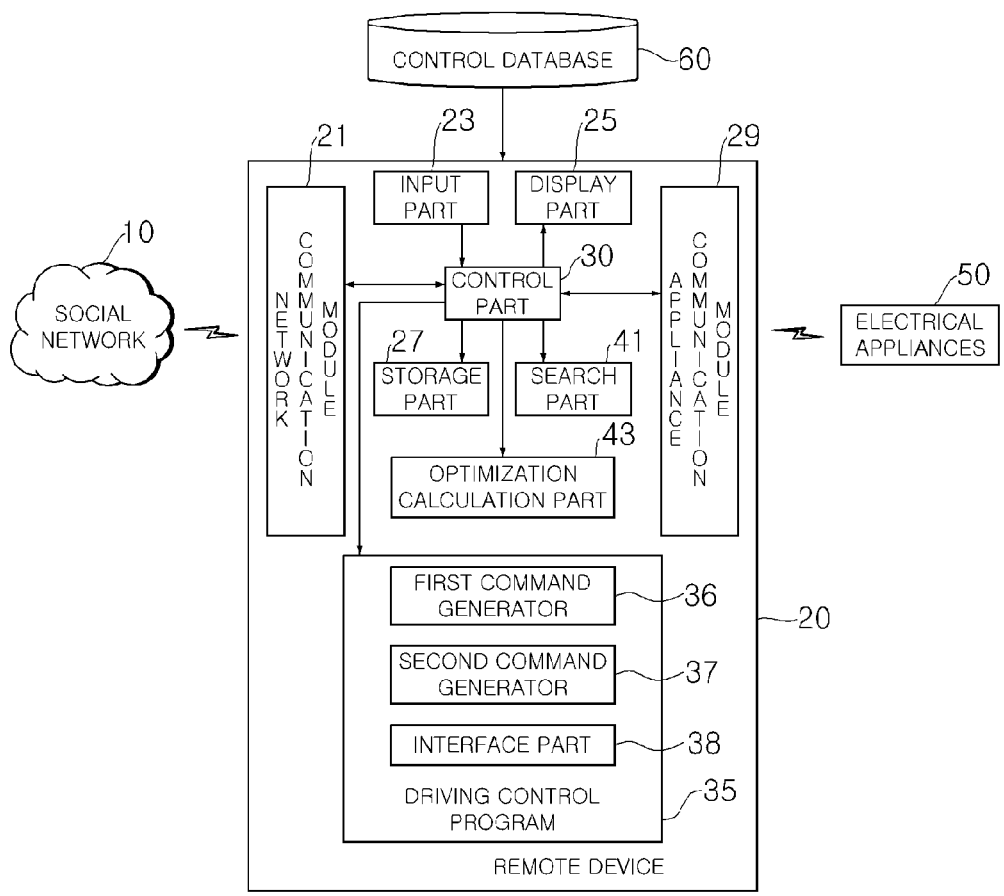
FIG. 4 is a block diagram of an electrical appliance control system using the remote device according to another exemplary embodiment of the present invention.

FIG. 4 is a simplified diagram of the electrical appliance control system using the remote device according to another exemplary embodiment of the present invention.

The electrical appliance control system of this embodiment includes various electrical appliances 50 usable by the user inside or outside the home, a social network 10 for receiving the optimal control data for optimally controlling the electrical appliances 50, a control database 60 for storing the optimal control data input from a plurality of users, and a remote device 20 for controlling the electrical appliances 50 using the optimal control data obtained through the social network 10 and the control database 60.

The electrical appliance 50 and the social network 10 of this embodiment, which are substantially the same as those of one exemplary embodiment, function the same as in one exemplary embodiment and shall not be further explained.

The control database 60 is a database constructed to obtain the optimal control data for the user, and the user can upload the optimal control data generated with his/her experience or conjecture to the control database 60. In addition, the manufacturer or the developer of the electrical appliance 50 may upload the upgraded optimal control data to the control database 60. It is advantageous that the optimal control data stored in the control database 60 should be generated as the control file for the automatic processing in the remote device 20.

As various optimal control data stored to the control database 60 are uploaded by the plurality of the users, the various optimal control data can be provided even for a single input condition.

For example, when jeans are washed using the washing machine, the first optimal control data uploaded by the first user can set the washing 10 minutes, the rinsing 10 minutes, the washing temperature with tepid water, and the high spinning speed. By contrast, the second optimal control data of the second user can set the washing 15 minutes, the rinsing 13 minutes, the washing temperature with cold water, and the highest spinning speed. That is, when there are 10 users who upload the optimal control data for washing the jeans, 10 users can upload the optimal control data of different values.

Alternatively, one optimal control data may be needed for a plurality of input conditions. For example, when a hood T-shirt, the jeans, underwear, and a blouse are washed all together, the optimal control data of a mode for optimally washing the laundries is required.

For doing so, the remote device 20 generates new optimal control data most appropriate by collecting and processing all of the optimal control data. To this end, the remote device 20 further includes a search part 41 and an optimization calculation part 43 in addition to an appliance communication module 29, a network communication module 21, a storage part 27, an input part 23, a display part 25, a driving control program 35, and a control part 35 of the remote device 20 of the one exemplary embodiment.

When the user accesses the control database 60 through the remote device 20 and inputs his/her intended condition, the search part 41 searches the control database 60 and fetches one or more optimal control data satisfying the corresponding condition. The fetched optimal control data is fed to the optimization calculation part 43.

It is noted that a search engine for searching in real time for the optimal control data uploaded to a website, an Internet cafe, a blog, and an SNS, instead of the control database 60, may be used. When the control database 60 is substituted with the search engine, the user can input the searched optimal control data value to the remote device 20, and generate and utilize as the control file. At this time, as the search engine conducts the searching, the separate search part 41 is unnecessary.

Figure 5:
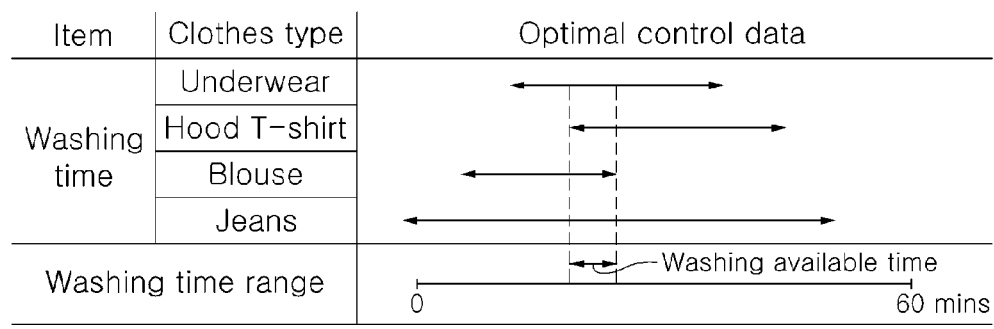
FIG. 5 is a diagram of calculation of new optimal control data in an optimization calculation part of FIG. 4.

When there are two or more optimal control data fetched, the optimization calculation part 43 generates new optimal control data by comparing item values of the multiple optimal control data. For example, as shown in FIG. 5, when the jeans, the hood T-shirt, the blouse, and the underwear are washed all together, the optimal control data for washing the underwear, the hood T-shirt, the blouse, and the jeans sets the washing time to 10~20 minutes, 15~30 minutes, 10~25 minutes, and 10~40 minutes respectively.

Hence, the optimization calculation part 43 calculates a washing available time of the washing machine and a new washing time by considering the washing time of the optimal control data. When the washing available time of the washing machine is 0~60 minutes, the washing time of the optimal control data lies within the washing time range set at the washing machine. Accordingly, the optimization calculation part 43 calculates the washing time of the plurality of the optimal control data and selects the common time. That is, the washing time is 20~25 minutes which is the common time duration of the optimal control data as shown in FIG. 5.

When the new optimal control data is represented as the duration, the optimization calculation part 43 can select the optimal control data by considering other conditions. For example, for the normal washing, the optimization calculation part 43 selects the median value of the duration as the optimal control data. For the speedy washing, the optimization calculation part 43 selects the lowest value in the duration. For the fine washing, the optimization calculation part 43 selects the highest value in the duration.

The new optimal control data calculated by the optimization calculation part 43 is provided to the second command generator 37 of the driving control program 35. The second command generator 37 generates the control command by processing the new optimal control data generated as the control file.

Figure 6:
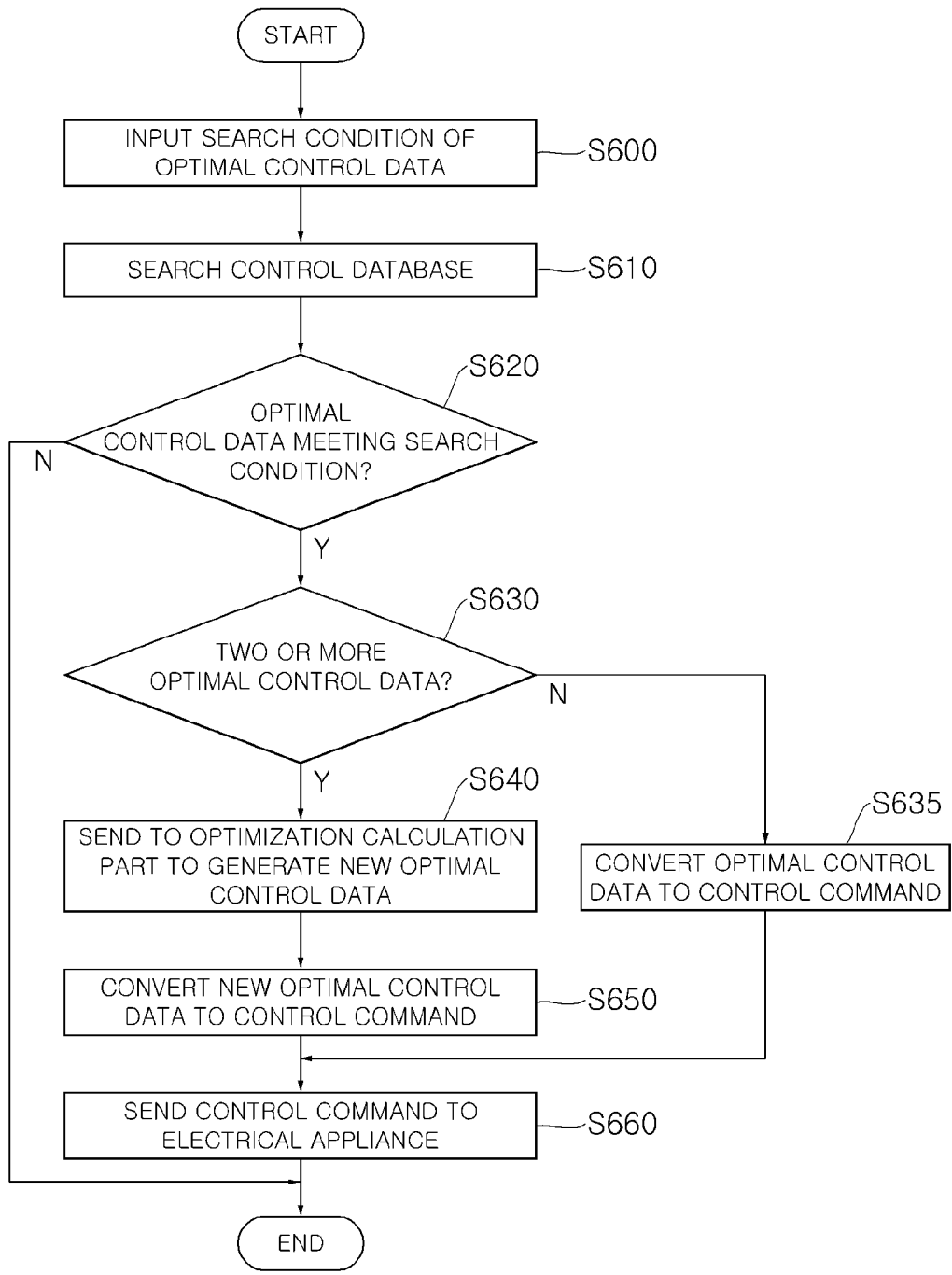
FIG. 6 is a flowchart of a method for controlling the electrical appliance in the electrical appliance control system using the remote device according to another exemplary embodiment of the present invention.

FIG. 6 is a flowchart of a method for controlling the electrical appliance in the electrical appliance control system using the remote device according to another exemplary embodiment of the present invention.

In the electrical appliance control system according to another exemplary embodiment of the present invention, the user can receive from the other person the optimal control data for controlling the electrical appliance 50 as the words, the text, the general file, or the control file as in the one embodiment. The control of the electrical appliance 50 by providing the words, the text, or the general file to the user and the control of the electrical appliance 50 by providing the control file have been explained in FIG. 3 and their descriptions shall be omitted.

In the another embodiment, the user can receive the optimal control data using the control database 60 or the search engine.

When the user inputs the condition for searching for the optimal control data in the control database 60 through the remote device 20 (S600), the control part 30 forwards the input condition to the search part 41. The search part 41 fetches the optimal control data satisfying the condition of the user by searching the control database 60 (S610 and S620). At this time, when only one optimal control data is fetched (S630-N), the control part 30 sends the corresponding optimal control data to the second command generator 37 of the driving control program 35 (S635).

By contrast, when fetching the plurality of the optimal control data (S630-Y), the control part 30 sends the corresponding optimal control data to the optimization calculation part 43. The optimization calculation part 43 generates new optimal control data by comparing the items of the optimal control data and extracting the common part (S640). The control part 30 sends the new optimal control data generated to the second command generator 37 of the driving control program 35.

The second command generator 37 of the driving control program 35 generates the control command for controlling the electrical appliance 50 (S650). The control part 30 sends the control command to the appliance communication module 29 to forward the control command to the corresponding electrical appliance 50 (S660). According to the control command received from the remote device 20, the controller 53 of the electrical appliance 50 drives the device 55 based on the optimal control data.

Meanwhile, when the search engine is used instead of the control database 60, as aforementioned, the optimal control data searched by the search engine is directly fed to the driving control program 35, or the new optimal control data is generated by the optimization calculation part 43 and then provided to the driving control program 35, based on the number of the optimal control data. Yet, since it is highly likely that the optimal control data searched by the search engine is the text or the general file, the optimal control data can be sent to the first command generator 36 of the driving control program 35 to generate the control command.

Figure 7:
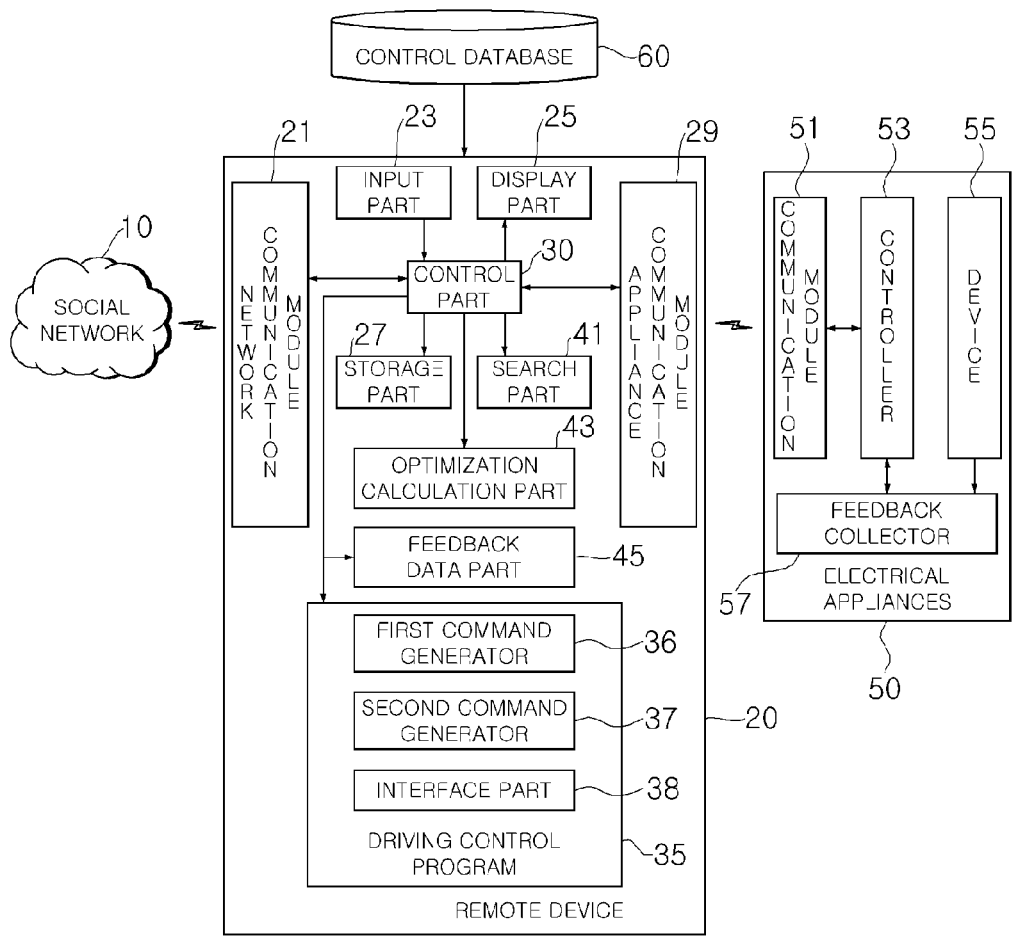
FIG. 7 is a block diagram of an electrical appliance control system using the remote device according to yet another exemplary embodiment of the present invention.

FIG. 7 is a block diagram of an electrical appliance control system using the remote device according to yet another exemplary embodiment of the present invention.

The electrical appliance control system according to yet another exemplary embodiment of the present invention are substantially similar to the electrical appliance control system 50 according to another exemplary embodiment of the present invention, in the fact that it includes various electrical appliances 50, a social network 10, a control database 60, and a remote device 20. Yet, the electrical appliance control system 50 in yet another exemplary embodiment provides feedback data to the remote device 20. According to this function, the components of the electrical appliance 50 and the remote device 20 are quite different from those in one and another embodiments as described above.

Hence, the redundant components shall not be further explained, and only the added functions of the electrical appliance 50 and the remote device 20 are elucidated.

The electrical appliance 50 includes a controller 53 for controlling the electrical appliance 50, various devices 55 controlled by the controller 53, and a communication module 51 for communicating with the remote device 20 as aforementioned in FIG. 2. In addition, the electrical appliance 50 further includes a feedback collector 57.

While or after the electrical appliance 50 operates according to the optimal control data provided from the remote device 20, the feedback collector 57 collects and compares control status and result of the electrical appliance 50 with the optimal control data.

For example, when the user wants the air condition to reach his/her intended temperature within 3 minutes, the user obtains the optimal control data meeting the personal use environment, such as the same model, the air conditioner capacity, the room structure, and the room size, using the social network 10, the control database 60, or the search engine. Next, the remote device 20 sends the control command for the optimal control data to the air conditioner to drive the air conditioner. While the air conditioner operates using the optimal control data, the feedback collector 57 monitors the temperature detected by a temperature sensor of the air conditioner in real time. That is, the feedback collector 57 calculates the temperature change based on the time, compares the temperature change with the optimal control data, and thus determines whether the temperature changes as suggested by the optimal control data or whether the intended room temperature is achieved within 3 minutes.

The controller 53 sends the information collected and analyzed by the feedback collector 57 to the remote device 20 through the communication module.

To process the feedback information from the electrical appliance 50, the remote device 20 includes an appliance communication module 29, a network communication module 21, a storage part 27, an input part 23, a display part 25, a driving control program 35, a control part 30, a search part 41, and an optimization calculation part 43 as in the remote device 20 of the another embodiment, and further includes a feedback data part 45.

The feedback data part 45 processes the feedback data provided from the electrical appliance 50 into the form displayable in the display part 25 of the remote device 20, and uploads the feedback information to the control database 60. Hence, the user can determine whether the optimal control data applied to the electrical appliance 50 through the remote device 20 can attain the user's intended result. Also, the feedback information for the corresponding optimal control data is added to the control database 60 so that other users intending to use the corresponding optimal control data can refer to it.

Figure 8:
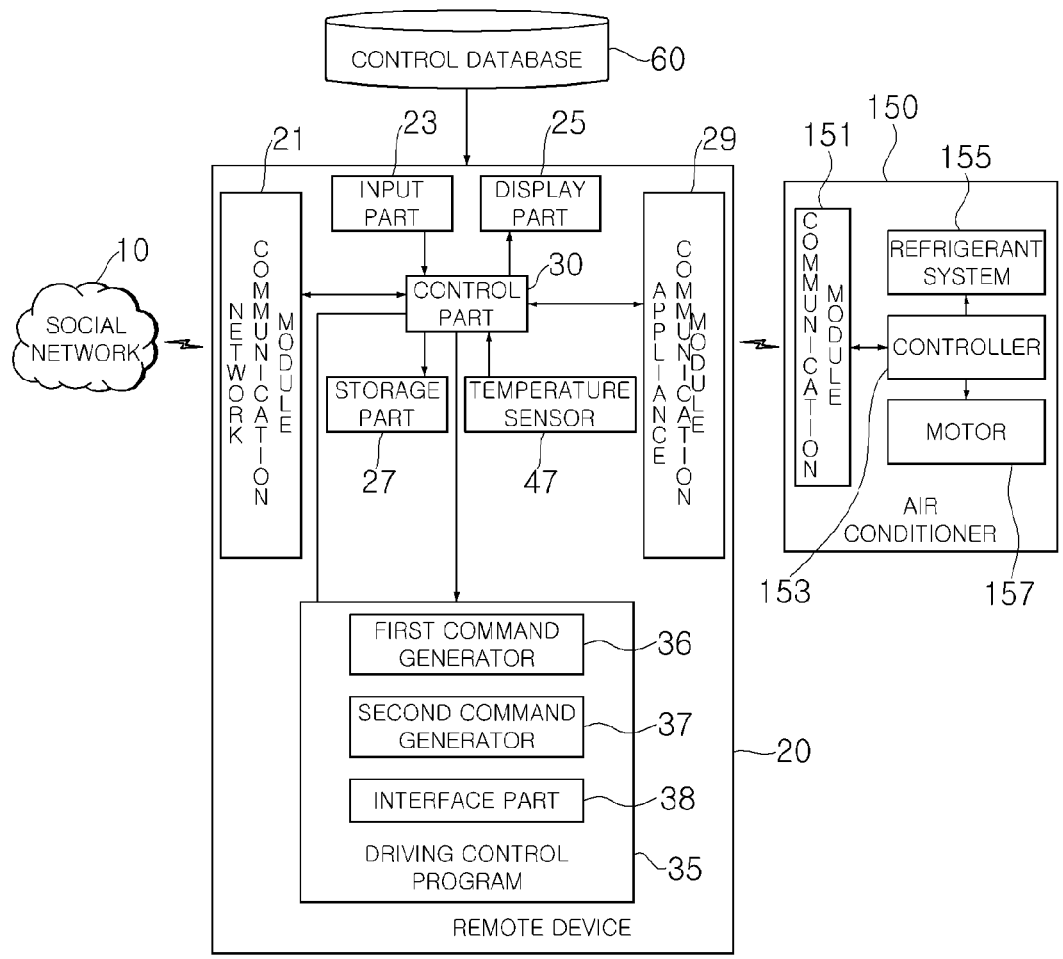
FIG. 8 is a block diagram of the electrical appliance control system using an air conditioner as the electrical appliance.

FIG. 8 is a block diagram of the electrical appliance control system using the air conditioner as the electrical appliance.

While the electrical appliance control system of the one embodiment is now explained mainly, the air conditioner 150 and the remote device 20 can be applied to the electrical appliance control systems of the another and yet another embodiments.

The electrical appliance control system installs a temperature sensor 47 for detecting the indoor temperature in the remote device 20, and controls the operation of the air conditioner according to the indoor temperature detected by the temperature sensor 47.

The remote device 20 includes the appliance communication module 29, the network communication module 21, the storage part 27, the input part 23, the display part 25, the driving control program 35, and the control part 30 as in the remote device 20 of the one, another, yet another embodiments, and further includes the temperature sensor 47.

The temperature sensor 47 measures the temperature at the location of the remote device 20. When the remote device 20 is in the room with the air conditioner, the temperature sensor 47 measures the indoor temperature in the room of the air conditioner. The temperature sensor 47 can employ various sensors generally installed to and used in the air conditioner.

As the temperature sensor 47 is installed, the controller 30 of the remote device 20 sends the temperature detected by the temperature sensor 47 to the air conditioner through the appliance communication module 29.

The air conditioner 150 includes a refrigerant system 155 including an evaporator, a compressor, and a condenser, a motor 157 for controlling air circulation and wind direction, and a control device 153 for controlling the motor 157 and the refrigerant system 155 as in the typical air conditioner, and further includes a communication module 151 for communicating with the remote device 20 of the electrical appliance 50 of the one embodiment, the another embodiment, and the yet another embodiment.

When receiving the information of the indoor temperature through the communication module 151, the control device 153 of the air conditioner controls the refrigerant system 155 and the motor 157 until the indoor temperature reaches the user's set temperature. In so doing, the control device 153 can control the refrigerant system 155 and the motor 157 using a cooling mode selected by the user or the optimal control data provided through the remote device 20.

The electrical appliance control system attains the user's intended result and enhances the user's convenience and satisfaction by sharing the optimal control data for operating the electrical appliance between the users using the social network or the control database. When the multiple optimal control data satisfy the intended condition, new optimal control data is generated by considering the optimal control data and thus more optimal result is yielded.

While or after the electrical appliance operates using the optimal control data, its operation result is fed back. Thus, the optimal control data can be assessed and upgraded to attain more optimal result.

In the air conditioner, the temperature sensor for detecting the indoor temperature is installed to the remote device to control the operation of the air conditioner. Thus, the conventional operation control of the air condition merely based on the temperature around the air conditioner by installing the temperature sensor to the air conditioner can be prevented. That is, as the air conditioner operates based on the actual indoor temperature, the intended indoor temperature can be achieved and the user's satisfaction can be promoted.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A remote device having an electrical appliance control function, comprising:
    an appliance communication module for communicating with an electrical appliance which is used by a user inside or outside home using power;
    a network communication module for supporting communication with outside to obtain user set optimal control data which controls the electrical appliance to operate in some other mode than an operation mode basically provided by a manufacturer of the electrical appliance;
    a control part for controlling the electrical appliance based on the user set optimal control data; and
    an optimization calculation part for, when two or more optimal control data are obtained, generating new optimal control data by comparing the multiple optimal control data.

2. The remote device of claim 1, further comprising:
    a storage part for storing the optimal control data; and
    a driving control program for generating a control command with the optimal control data to control the electrical appliance,
    wherein the control part controls the driving control program according to an input of the user, and sends the control command to the electrical appliance.

3. An electrical appliance control system using a remote device, comprising:
    an electrical appliance used by a user inside or outside the user's home using power;
    a social network for providing user set optimal control data that controls the electrical appliance to operate in a mode other than an operation mode provided by a manufacturer of the electrical appliance; and the remote device for controlling the electrical appliance using the optimal control data obtained via the social network, wherein the social network comprises at least one of a human network formed by actually contacting other people offline, and an online network that includes an online cafe, a blog, Twitter, or Facebook, formed via the Internet.

4. The electrical appliance control system of claim 3, wherein the electrical appliance comprises:
   a plurality of devices for performing an intrinsic function of the electrical appliance;
   a communication module for communicating with the remote device; and
   a controller for controlling the plurality of the devices using the optimal control data provided from the remote device.

5. The electrical appliance control system of claim 3, wherein the remote device comprises:
   an appliance communication module for communicating with the electrical appliance;
   a network communication module for communicating with the social network;
   a storage part for storing optimal control data obtained through the social network, and various programs;
   an input part for inputting data or command input from the user;
   a display part for displaying input contents of the user and the operation of the remote device;
   a driving control program for generating a control command to control the electrical appliance, with optimal control data obtained through the social network; and
   a control part for controlling the driving control program according the user input, and providing the control command to the electrical appliance.

6. The electrical appliance control system of claim 5, wherein the driving control program comprises:
   a first command generator for generating a control command to control the electrical appliance, with the optimal control data obtained and input by the user through the human network or the online network;
   a second command generator for generating a control command by processing optimal control data stored as a control file processable by the driving control program, among the optimal control command obtained through the online network; and
   an interface part for providing a user interface through which the user inputs optimal control data.

7. The electrical appliance control system of claim 3, further comprising:
   a control database for storing optimal control data generated by the user, a manufacturer, and a developer,
   wherein the remote device further comprises:
   a search part for searching and fetching optimal control data which satisfies an intended condition of the user among the optimal control data stored to the control database.

8. The electrical appliance control system of claim 7, wherein the remote device further comprises:
   an optimization calculation part for, when there are two or more optimal control data fetched by the search part or the search engine, generating new optimal control data by comparing the multiple optimal control data.

9. An electrical appliance control system using a remote device, comprising:
   an electrical appliance used by a user inside or outside the user's home using power;
   a social network for providing user set optimal control data that controls the electrical appliance to operate in a mode other than an operation mode provided by a manufacturer of the electrical appliance;
   the remote device for controlling the electrical appliance using the optimal control data obtained via the social network; and
   a search engine for searching optimal control data uploaded to a website, an Internet cafe, a blog, and a Social Network Service (SNS) in real time.

10. An electrical appliance control system using a remote device, comprising:
    an electrical appliance used by a user inside or outside the user's home using power;
    a social network for providing user set optimal control data that controls the electrical appliance to operate in a mode other than an operation mode provided by a manufacturer of the electrical appliance; and
    the remote device for controlling the electrical appliance using the optimal control data obtained via the social network;
    wherein the electrical appliance further comprises a feedback collector for, while or after the electrical appliance operates according to optimal control data provided from the remote device, collecting control status and result of the electrical appliance and generating feedback data by comparing the control status and result with the optimal control data, and
    wherein the remote device further comprises a feedback data part for processing and storing the feedback data provided from the electrical appliance.

11. An electrical appliance control system using a remote device, comprising:
    an electrical appliance used by a user inside or outside the user's home using power;
    a social network for providing user set optimal control data that controls the electrical appliance to operate in a mode other than an operation mode provided by a manufacturer of the electrical appliance; and
    the remote device for controlling the electrical appliance using the optimal control data obtained via the social network; wherein
    the electrical appliance is an air conditioner,
    a temperature sensor for measuring an indoor temperature is mounted to the remote device,
    the control part sends the indoor temperature detected by the temperature sensor to the electrical appliance through the appliance communication module, and
    the air conditioner is controlled according to the measured indoor temperature as provided from the remote device.

12. A remote device having an electrical appliance control function, comprising:
    an appliance communication module for communicating with an electrical appliance which is used by a user inside or outside the user's home using power;
    a network communication module for obtaining user set optimal control data that controls the electrical appliance to operate in a mode other than an operation mode provided by a manufacturer of the electrical appliance;
    a control part for controlling the electrical appliance based on the user set optimal control data; and
    a feedback data part for, while or after the electrical appliance operates according to the optimal control data provided by the remote device, receiving from the electrical appliance, processing, and storing control status and result of the electrical appliance, and feedback data generated by comparing the control status and result with the optimal control data.

13. The remote device of claim 12, further comprising:
a storage part for storing the optimal control data; and
a driving control program for generating a control command with the optimal control data to control the electrical appliance,
wherein the control part controls the driving control program according to an input of the user, and sends the control command to the electrical appliance.

* * * * *